A. J. HODGE.
PACKING BOX.
APPLICATION FILED JUNE 10, 1916.
1,258,901.
Patented Mar. 12, 1918.
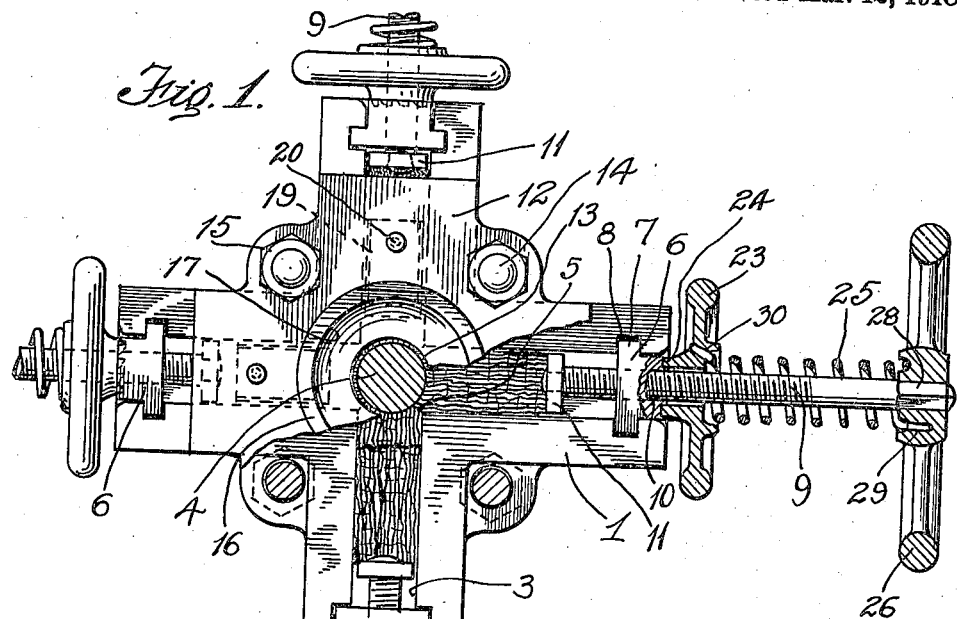
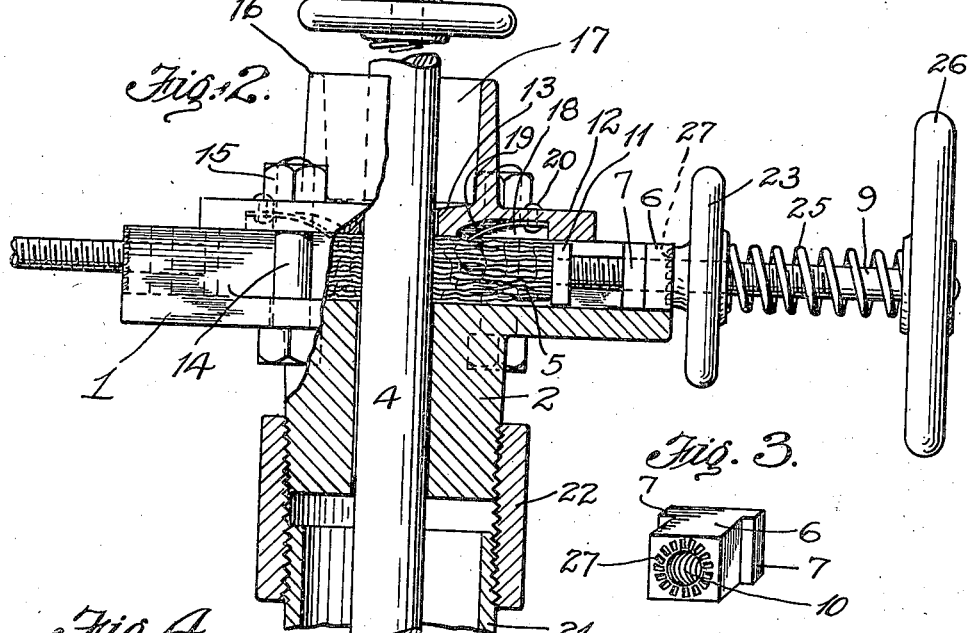
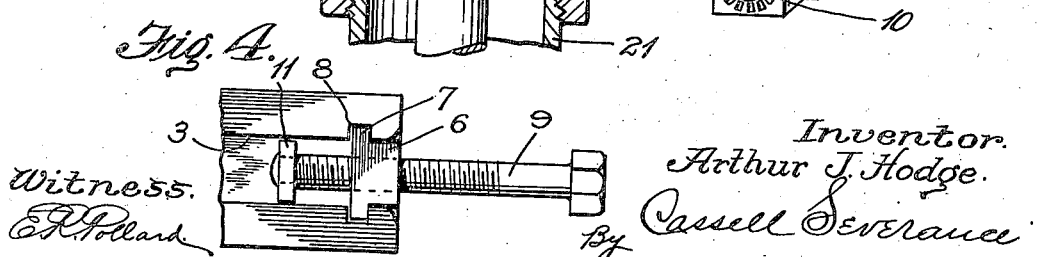
Witness
E. R. Pollard
Inventor
Arthur J. Hodge
By Cassell Severance
Atty.

UNITED STATES PATENT OFFICE.

ARTHUR J. HODGE, OF LONG BEACH, CALIFORNIA, ASSIGNOR TO CLYDE VAUGHN, OF PASADENA, CALIFORNIA.

PACKING-BOX.

1,258,901.

Specification of Letters Patent. Patented Mar. 12, 1918.

Application filed June 10, 1916. Serial No. 102,863.

*To all whom it may concern:*

Be it known that I, ARTHUR J. HODGE, a citizen of the United States, residing at Long Beach, in the county of Los Angeles and State of California, have invented certain new and useful Improvements in Packing-Boxes, of which the following is a specification.

This invention relates to improvements in packing or stuffing boxes and is especially applicable to the packing of moving rods, pistons or the like where it is important that a tight joint be made with the said moving part, without interfering with its action.

It is an object of the invention to provide a packing device for rods, shafts, or the like, in which outwardly extending channel ways may be provided for receiving packing material, the packing material being arranged with its fibers extending in a general longitudinal direction, whereby the ends thereof will be worn off by the movement of the rod or piston.

It is also an object of the invention to provide a packing device in which channels are employed for guiding and holding packing means in endwise relation to a moving rod or piston, means being provided for forcing the packing means inwardly under pressure, while additional means is used for preventing a return movement in said packing, especially when additional packing is added in the said channel ways.

It is also a further object of the invention to provide a packing device with radiating channels for directing or holding packing about a moving member or rod, removable abutment pieces being employed in the said channel ways for holding follower blocks carried by the screws whereby the packing may be forced inwardly.

It is a still further object of the invention to provide a device of this kind in which the packing, compressing or feeding screws are provided with automatic means for continuously forcing the packing inwardly.

With these and other objects in view the invention comprises certain novel constructions, combinations and arrangements of parts as will be hereinafter more fully described and claimed.

In the accompanying drawing forming a part of this specification:—

Figure 1 is a top plan view of a packing device embodying the spirit of the invention, a portion of the top or cap plate being broken away to better reveal the structure.

Fig. 2 is a view partially in side elevation and partially in central section of the packing box of the device.

Fig. 3 is a detail perspective view of one of the removable abutment blocks for holding the feed screw in place.

Fig. 4 is a top plan view of one of the feed screw devices held in place by its abutment block and without the automatic feed mechanism shown in Figs. 1 and 2.

The packing or stuffing box forming the subject matter of this invention is designed to afford a means for packing a movable rod or shaft, pump device or the like in which the shaft, piston rod, or other means will be closely incased by a packing means capable of forming a tight joint therewith, and yet without interfering with its motion or operation. It has been found that fibrous packing material may be employed to advantage when the ends of the fibers are presented to the member to be packed, whereby the end of said packing material wears off instead of the side thereof. The packing material may be formed in blocks or sticks with its fibrous material laid with the fiber extending longitudinally of such block or stick, as when the fibrous packing is laid parallel or is braided or platted. With such a packing forced into the channel ways provided in the present case a very superior result is obtained and a very effective joint is afforded about the rod, pump rod, piston or shaft to be packed. The details and features of the invention will now be more particularly described, bringing out specifically the form of the mechanism adapted for making use of packing of this kind, though of course it will be understood that the packing box is adapted for the use with any kind of packing material, whether it be arranged with its fibers longitudinal of the channels or not.

In the accompanying drawing, in which preferred forms of the invention are disclosed, 1 indicates the body portion of the packing device, it being provided with a central rod or shaft inclosing portion 2 from which radiate or extend outwardly channels 3. The channels are formed in the upper part of the body portion 1 and preferably radiate from the piston rod or shaft 4. These channels are preferably rectangular in cross-section and are made sufficiently long to permit of the insertion of additional blocks of packing when the packing within the device has become nearly worn out. Sufficient space is left around the piston rod 4 at the points where the channels 3 meet as at 5, for the inner ends of the packing material to be forced tightly together so that the packing bears upon the rod or shaft entirely around the same. The outer end of each channel is provided with a removable abutment member or block 6, preferably having a body portion adapted to fit in the channel and having flanges 7 forming a head portion that is adapted to removably engage grooves or recesses 8 formed in the opposite channel walls near the outer end of the channel. Each abutment block may thus be lifted out of position or returned to its place in its channel, when it is necessary to remove the pressure or feed screws of the device.

Each abutment block carries a feed or adjustment screw 9 having the external threads thereof engaging interior threads formed within the aperture 10 which passes through the said block. The inner end of each feed screw carries a follower plate or block 11 approximately filling the cross sectional area of the channel and adapted to bear upon the outer end of the packing. By turning the screw within the abutment block the follower plate or block can be pushed inwardly so as to keep the packing against the piston rod or shaft 4. The central or inner portions of the channels are covered by a removable top or cover plate 12 having a central opening 13 to fit around the shaft or rod 4 and to close the inner portions of the channels 3 at the top. Bolts 14 and nuts 15 are employed for holding the top plate in position. The said top plate or cover 12 is also provided with an upwardly projecting annular flange or wall 16 which incloses a space 17 around the piston rod or shaft 4, and which is adapted to receive grease or other packing means where such material is desirable, for lubrication.

The inner surface of the cover 12 is provided with a series of recesses 18 immediately above the channels in the body portion 1 of the device and holding means, as for instance the spring pieces 19 are mounted therein, their inner free ends being adapted to act as retaining dogs to bear upon the packing material in the channel ways and prevent any retrograde movement therein. The said spring pieces may be riveted at 20 or otherwise secured at their outer ends in the said recesses. The packing material can readily be pushed beneath the spring pieces in forcing it against the piston or shaft, which spring pieces will tend to hold the said packing material from any return movement as will be readily understood by reference to Fig. 2 of the drawing. The cap plate 12 does not cover the outer ends of the channels, a sufficient space being left uncovered for facilitating the removal of the abutment blocks 6 together with the screws and follower plates out of position without disturbing the said cap plate 12. The lower end of the hub portion 2 may be externally threaded so as to be coupled with a pump casing 21 by means of a collar or coupling 22 when the device is to be used on the top of an oil or other well, though of course the packing box may be secured to other devices in this or other ways, without departing from the spirit of the invention.

Means is also preferably provided for automatically pushing the packing inwardly said means usually consisting of a ratchet wheel 23 having ratchet teeth or projections 24 adapted to bear against the outer end of each abutment block 6, and a spring 25 interposed between the same and a hand wheel 26 fastened upon the outer end of the feed screw. The ratchet teeth 24 are adapted to engage and hold in ratchet recesses or teeth 27, formed upon the block 6 in the outer end of the channel. When using the hand wheel 26, the outer end of the feed screw is usually squared as at 28 to receive the said hand wheel. The outer end of the spring 25 has one end securely fastened in a recess 29 in the hub of said hand wheel and has its other or inner end secured in a recess 30 formed in the hub of said ratchet wheel 23. After the feed screw has been adjusted by the hand wheel 26 for forcing a body of packing inwardly, the wheel 23 may be turned upon the face of the block 6, until a tension has been placed upon the spring 25 sufficiently to cause the same to have an action upon the feed screw, tending to turn the same inwardly. The said feed screw will thus continuously force the packing inwardly in the channel way and will take up any slack in the said packing.

In using the device, the packing pieces or blocks are placed in the channels and the screws with or without the automatic means are employed for forcing the said packing tightly against the piston rod or shaft 4. When the packing has been worn so as to be considerably shorter than when first placed in position, the feed screw is retracted and the block 6 removed from the end of the channel after which a new block or piece of packing material can be pushed into the channel behind the one already therein, following which the abutment block is again put in place and the feeding device set up. With the elongated channels employed and with the retaining springs 19, the adding of packing material can be accomplished without interfering in any way with the action of the rod or shaft which operates through the packing device. A device of this kind is found especially effective in use upon oil wells where it has been very difficult heretofore to effectively pack piston rods or connecting rods employed in the pumping of oil from a well. With a device of this character the packing is so effective that the leakage of oil is entirely prevented and the oily, dirty conditions frequently surrounding such a well are entirely obviated. In connection with an oil well also, the placing of hard grease in the cup or recess 17, is found additionally useful since it prevents the packing device from becoming dry and heated.

What is claimed is:—

1. A packing box comprising a body portion having inwardly extending elongated channel ways adapted to receive packing material whereby said material may be presented in endwise engagement with the member to be packed, and means for preventing the withdrawal of the said packing.

2. A packing box for piston rods, shafts or the like having channel ways leading toward the member to be packed and means adapted to engage the said packing and prevent its return movement from engagement with the said rod or shaft.

3. A packing box comprising a body portion having radiating channel ways adapted to meet about a rod or shaft to be packed, a cap plate for closing said channels and having detents upon its inner face for preventing the outward movement of the packing, and packing material mounted in said channel ways.

4. A packing box comprising a body portion having radiating channel ways meeting about a rod or shaft to be packed, a cover plate, packing material adapted to be forced inwardly through said channel ways, spring detents mounted on said cap plate and bearing upon the packing to prevent it from being forced outwardly, and screw means for forcing the packing inwardly in the said channel ways.

5. A packing box comprising a body portion adapted to encompass a rod or shaft to be packed, packing mounted in said channel ways, a cap plate capable of holding said packing in place and provided with a receptacle surrounding the rod or shaft to be packed and adapted to receive a lubricant, follower plates fitting in the channel ways, abutment blocks also mounted in said channel ways and feed screws capable of inward movement through said abutment blocks and of moving the follower plates against the said packing.

6. A packing box comprising a body portion having guide ways leading to the article to be packed, packing mounted in said guide ways, screws for forcing the packing inwardly, in said guide ways, and removable abutment blocks for holding the said screws and facilitating their operation to compress the packing material.

7. A packing box comprising a body portion having a central passage for a rod or shaft to be packed and having passage ways leading thereto, packing material mounted in said passage ways, feed screws for forcing the packing tightly against the rod or shaft to be packed, abutment blocks fitting in said channels and having holding flanges thereon, the said passage ways having recesses for engaging said flanges, the said blocks having ratchet holding means for their outer faces, a ratchet wheel engaging each feed screw, a ratchet means on the abutment blocks the ratchet means on the abutment blocks and springs interposed between the ratchet wheels and the hand wheels, whereby the springs may be twisted for exerting a tension on the feed screws and normally feeding them inwardly.

8. In a piston rod packing device, a body member encompassing the piston rod having a channel therein, a block mounted to extend across said channel and having an internally threaded bore, and formed with ratchet teeth encircling the bore on one end thereof, a threaded shaft extending through the bore longitudinally of the channel, a follower block on said threaded shaft slidable in the channel, a packing material in the channel interposed between the follower block and the piston rod, a hand wheel on said threaded shaft, a coil spring wound around said shaft having one end attached to the hand wheel and arranged to exert a rotary pull on said threaded shaft tending to advance same through the threaded bore, and a second hand wheel revolubly mounted on the block formed with ratchet teeth adapted to engage the teeth on the block to which the opposite end of the spring is attached, and whereby tension of said spring may be adjusted.

9. In a piston rod packing device, a body member encompassing a piston rod having a channel therein, a block extending across said channel formed with ratchet teeth on one end thereof and having an internally threaded bore, a threaded shaft extending through the bore, a follower block on said threaded shaft slidable in the channel, a packing material interposed between the follower block and piston rod, a hand wheel rigidly mounted on said threaded shaft, a second hand wheel revoluble in relation to the shaft having ratchet teeth adapted to engage the ratchet teeth on the block, and a single spring operating to maintain the second hand wheel in engagement with the ratchet teeth on the block and operating to exert a rotary pull on the threaded shaft tending to advance the same.

10. In a piston rod packing device, a body member encompassing a piston rod having a channel therein, a threaded shaft extending into said channel, a follower block on said shaft, a packing material interposed between the follower block and piston rod, a hand wheel mounted to have a rotary and reciprocal movement in relation to the threaded shaft, ratchet teeth adapted to engage said hand wheel, and a coiled spring engaging said hand wheel and threaded shaft and operating to maintain the hand wheel in engagement with the ratchet teeth and to exert a rotary pull on the threaded shaft.

11. In a piston rod packing device, a body member encompassing the piston rod having a channel therein, a block extending across said channel having an internally threaded bore, a hand wheel revolubly and reciprocally mounted on said block, ratchet teeth for engaging said hand wheel, a threaded stem extending through said block longitudinally of the channel, and a spring connected to said shaft and to the hand wheel operating to exert a rotary pull on the shaft and to exert a pressure on the hand wheel.

12. The combination of a threaded shaft, a threaded bearing therefor in which the shaft is adapted to be advanced and retracted, a helical spring connected to said shaft and exerting a rotary pull thereon tending to advance same, a rotary member to which the opposite end of the spring is attached, by means of which the tension of the spring may be adjusted, and a ratchet engaging said member to hold it against rotation by said spring.

13. The combination of a threaded shaft, an internally threaded bearing through which said shaft extends, and is adapted to be advanced longitudinally on rotation of the shaft, a spring exerting a rotary pull on said shaft tending to advance same in its bearings, a rotary and reciprocal member to which the opposite end of said spring is attached, having ratchet teeth thereon, and stationary ratchet teeth engageable with the ratchet teeth and rotary member to hold same against rotation by said spring.

14. The combination of a threaded shaft mounted for longitudinal movement, a hand wheel mounted to have rotary, reciprocal movement in relation to the threaded shaft, ratchet teeth adapted to engage said hand wheel, and a coiled spring engaging said hand wheel and threaded shaft, and operating to maintain the hand wheel in engagement with the ratchet teeth and to exert a rotary pull on the threaded shaft to advance same.

In testimony whereof, I have hereunto set my hand, in presence of two witnesses.

ARTHUR J. HODGE.

Witnesses:
CASSELL SEVERANCE,
ROSEBUD CARNES.